Nov. 7, 1967  H. F. SILVER ETAL  3,351,295
FIBERIZER

Filed Sept. 21, 1965  4 Sheets-Sheet 1

INVENTORS:
Harold F. Silver,
Clarence R. Steele,
BY Frank B. Price,

By Hume, Groen Clement & Hume
ATTYS

INVENTORS.
Harold F. Silver,
Clarence R. Steele,
Frank B. Price,
By Hume, Groen, Clement + Hume
Attys.

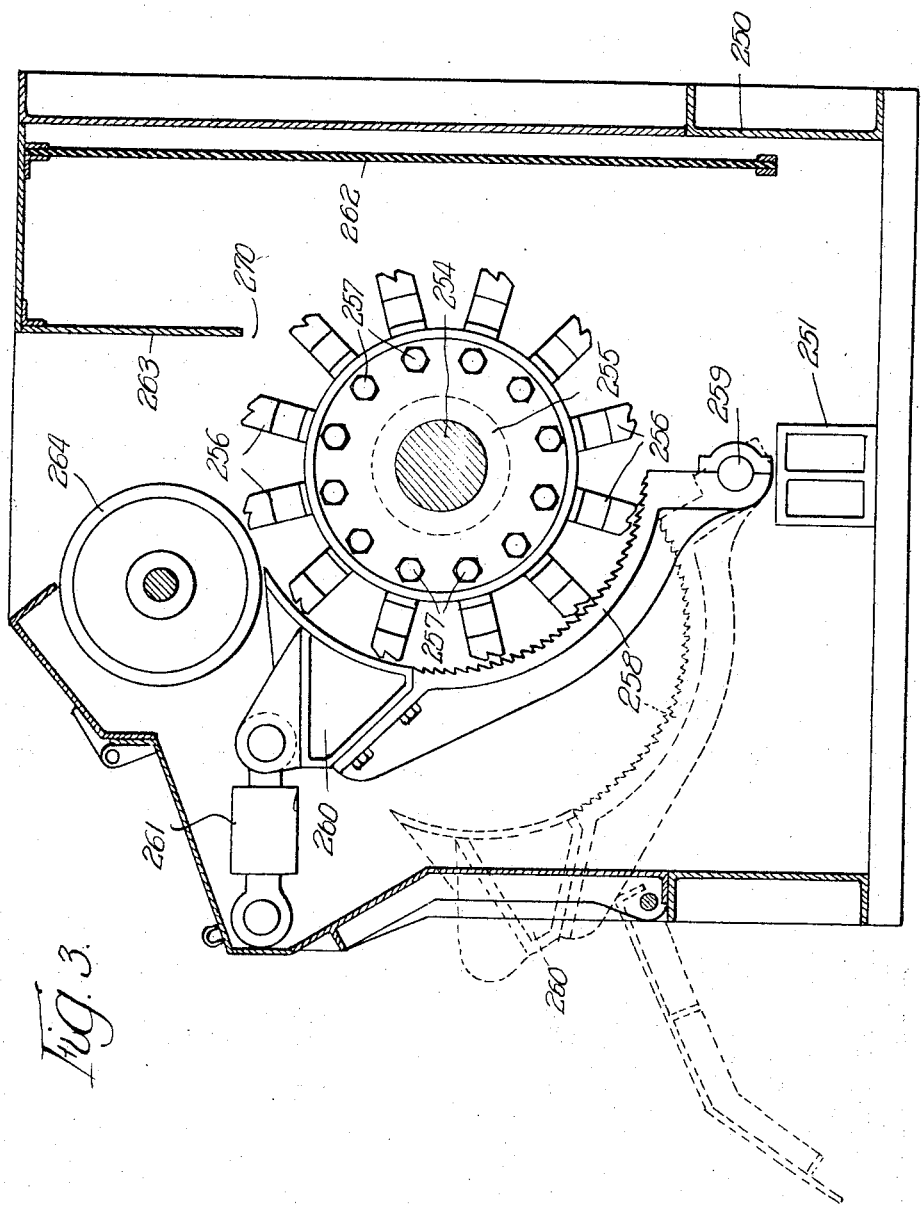

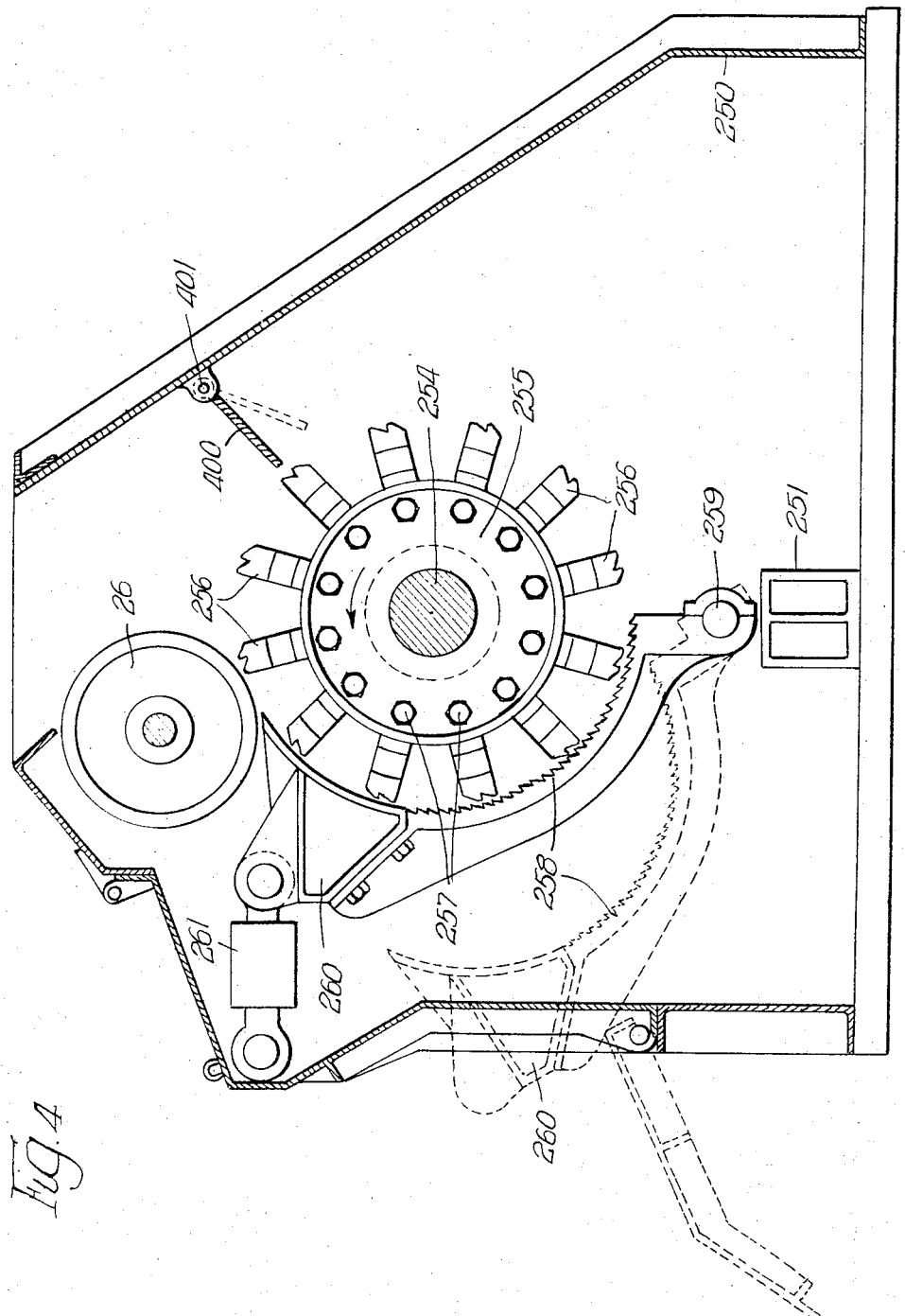

United States Patent Office 3,351,295
Patented Nov. 7, 1967

3,351,295
FIBERIZER
Harold F. Silver, Clarence R. Steele, and Frank B. Price, Denver, Colo., assignors to American Factors Associates, Limited, Honolulu, Hawaii, a corporation of Delaware
Filed Sept. 21, 1965, Ser. No. 489,009
5 Claims. (Cl. 241—187)

This application is a continuation-in-part of applicants' copending application Ser. No. 237,575, filed Nov. 14, 1962, and entitled "Solvent Extraction Process," now Patent No. 3,248,263.

The invention relates to a new and improved apparatus for processing substances such as sugar cane for the purpose of subdividing and fiberizing the cane and reducing it to a proper form for removal of a soluble constituent, such as sugar, therefrom by diffusion, leaching, or lixiviation.

According to the process defined in the above-identified parent application solid materials such as sugar cane should be subdivided to a size and consistency such as will provide a permeable mass in the diffuser which will lead itself to the diffusion activity described and claimed in said application.

When sugar cane is treated for the removal of sugar by diffusion as described in said application, the cane is preferably prepared for such treatment by subjecting it to the action of an apparatus referred to in said application as a "cane buster," and thereafter to the action of a "cane fiberizer." This invention relates to a new and improved cane fiberizer which is especially adapted for use in a cane diffusion system of the type above referred to, and as described and claimed in said copending application.

It is an object of this invention to provide a new and improved apparatus for fiberizing cane to a particular form and consistency which is productive of an appropriate permeability, and is conducive to a good diffusing, leaching, and lixiviating action.

A further object of this invention is to provide new and improved constructions for such fiberizing apparatus.

Other objects and advantages of this invention will be apparent to one skilled in this art as the following description proceeds. As illustrative of the invention, reference will now be made to the particular forms thereof shown in the accompanying drawings in which:

FIGURE 1 is a plan view of a system incorporating a diffusing, leaching, or lixiviating mechanism of the type described in said copending application which is especially adapted for processing sugar cane, and which incorporates, in addition to the extracting mechanism, a cane buster and a cane fiberizer for preparing the cane from the field preparatory to its introduction into the diffusing mechanism;

FIGURE 3 is an end elevational view of the fiberizer illustrated in FIGURE 2, partly in cross-section and with its end frame removed to show the internal construction; and FIGURE 4 is a view similar to FIGURE 3 showing a modified form of the invention.

Figure 1:
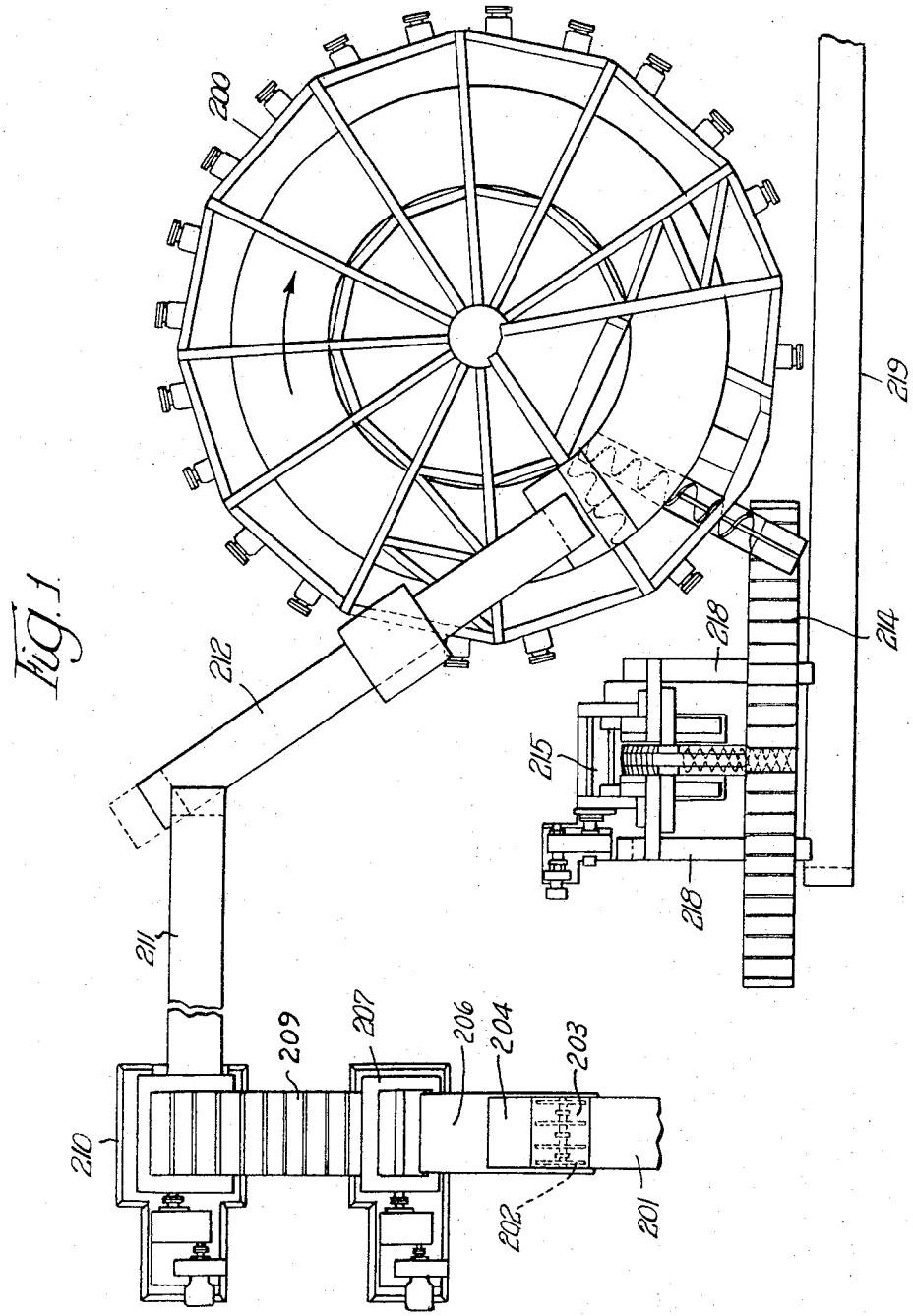

Referring now to FIGURE 1, it will be noted that the system illustrated comprises a diffuser 200, a cane buster 207, and the cane fiberizer 210, the latter of which constitutes the subject of this invention.

In operating a system of this type, the cane from the field, with or without previous cleaning, is initially introduced to the system on a moving cane carrier conveyor 201, which presents the cane to rotary cane knives 202, which cut the cane into sizes producing a handleable mass. The cane can so cut moves across the plate 203 and is advanced by the belt 204 over a magnetic pulley (not shown) which serves to remove any tramp iron. The cane is then fed into a hopper 206 above the cane buster 207. Preferably a sensing plate 208 is employed, mounted on a pivot 208a, so that it may be displaced in a manner representative of the quantity of cane being held at any one time in the hopper. The apparatus is so constructed that the angular position of the sensing plate is connected to control the speed of the cane carrier conveyor, with the result that the desired amount of cane is at all times available to the cane buster. The cane buster further reduces the size of the pieces of knifed cane and produces therefrom a mass of cane in the proper form to be presented to the cane fiberizer. The construction and operation of the cane buster is described in greater detail in another copending application. The cane so reduced in the buster is carrier by a conveyor 209 outwardly from the bottom of the buster and thence upwardly and deposited in the top of the cane fiberizer 210. The fiberized cane passes from the fiberizer upwardly on a belt 211 and is deposited on a scale conveyor 212 which serves to convey the fiberized cane to the diffuser 200 and, by suitable mechanism, not shown, to weigh and record continuously the amount of fiber to be processed. The fiberized cane is fed by the scale conveyor 212 to the material feeding scroll of the diffuser. After the fiberized cane is deposited in the diffuser and formed into an elongated mass, it is subjected to a diffusing operation. After being so processed the spent cane or wet bagasse is removed from the diffuser by the scroll and delivered to a conveyor 214 which conveys it to one or more bagasse presses. In the particular embodiment here illustrated only a single bagasse press is shown, but it is to be understood that two or more may be employed, if required, for parallel operation. Accordingly, conveyor 214 is illustrated as extended in order that excess material which cannot be received by the first bagasse press will be moved on to the next press. The bagasse press 215 receives wet bagasse from the conveyor 214. The pressed bagasse is discharged from the press through both sides thereof onto two conveyors 218—218, which are driven to discharge the carried pressed bagasse to a main pressed bagasse conveyor 219, which removes it for disposal. The juice extracted from the wet bagasse is pumped from the press through suitable piping, not shown, back to the diffuser.

Figure 2:
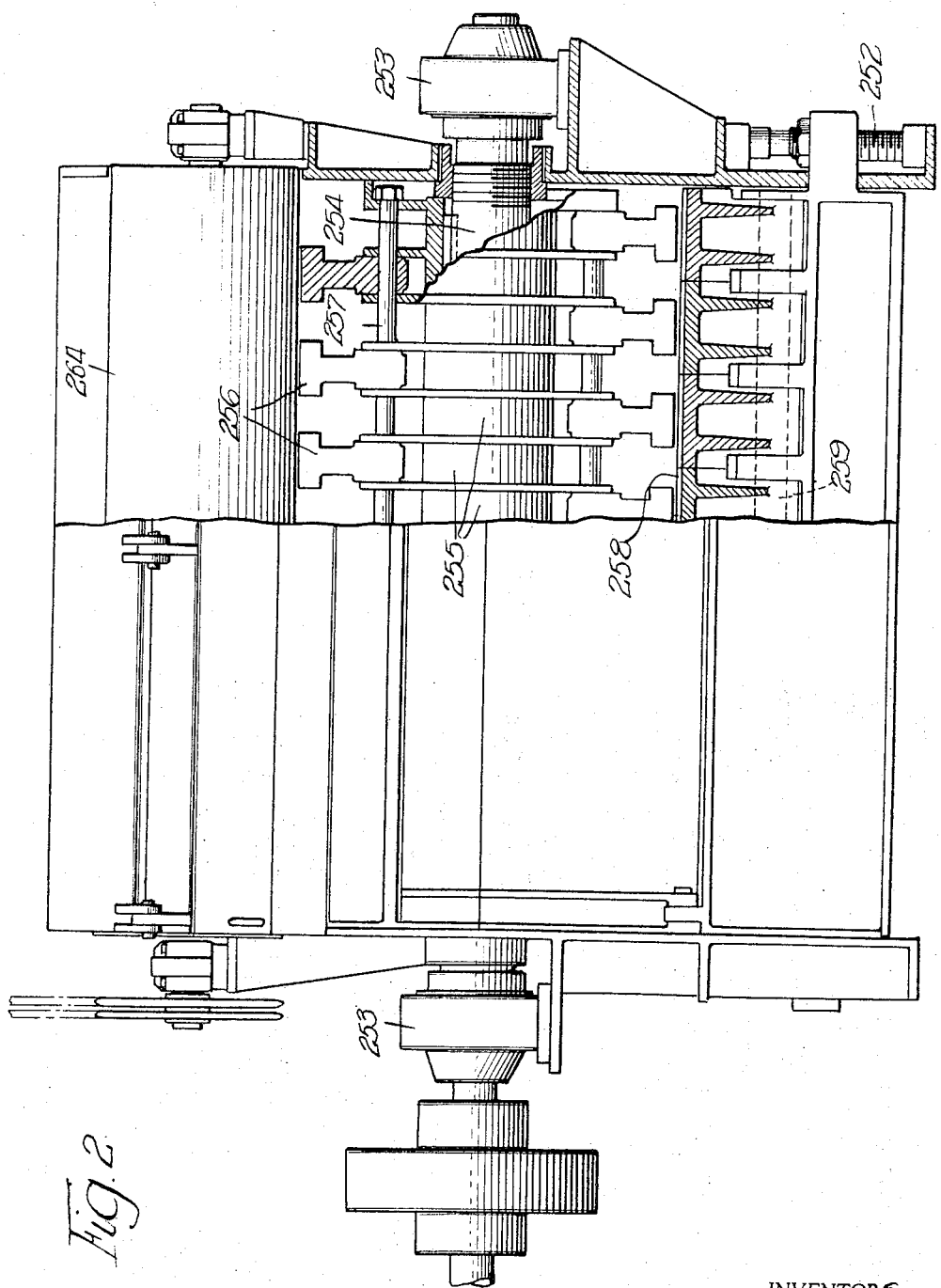
FIGURE 2 is a side elevational view of a cane fiberizer constructed in accordance wtih this invention, partly in cross-section to show the construction and disposition of the fiberizing hammers and with a covering wall partially broken away to disclose the internal arrangement of parts.

The fiberizer is illustrated in FIGURES 2 and 3 and in this form of the invention comprises a frame 250 having a supporting beam 251 which is vertically adjustable on a pair of screws 252—252. At its opposite ends the frame has a pair of bearing 253—253 for rotatably mounting a shaft 254 for accommodating the rotor designated generally as 255, having a plurality of hammers 256 mounted thereon by a series of suitable pins 257. Associated with the rotor is an anvil constructed as a toothed scrubbing board member 258 carried at its lower end on pins 259 mounted on the supporting beam 251. The anvil 258 is made up of a plurality of individual sections similarly constructed so as to collectively constitute the anvil and yet allow for sectional replacement when needed. The anvil as a whole is attached to a beam 260 which, in turn, is connected to the frame by a pair of turnbuckles 261—261. It will be seen that this anvil is adjustable through the rotation of the turnbuckle and through the lifting and lowering of the beam 251. In this case, the anvil is imperforate and the material fed to the fiberizer must pass over the surface of the anvil under the influence of the hammers and is discharged in a substantially horizontal direction against a wall or curtain 262.

In the operation of the apparatus, busted cane is fed into the top in the space provided between the wall or curtain 263 and the feed roller 264 which, in this case, is power driven. The cane so fed has been previously broken into chunks of variable size. These chunks, when subjected to the action of the rotor and the associated anvil, are fiberized; that is to say, are divided into individual fibers which carry the associated pith of the cane. By adjusting the space between the anvil and the ends of the hammers the character of the fiberized cane can be selected. The wall or curtain 262 prevents a build up of the fiberized cane at its point of impact and permits it to drop freely onto a suitable conveyor below. Associated with the fiberized cane is a substantial volume of air moving at the same high velocity. The air is disassociated from the fiberized cane at the wall or curtain 262 and passes upwardly and through opening 270 for recirculation by the rotor.

Here, again, it will be noticed that the hammers are constructed with two teeth or cutting edges on their outer ends. As particularly shown in FIGURE 2, the outer ends of the hammers are widened so that collectively they sweep substantially the entire surface of the anvil. The anvil employed in this fiberizer is also capable of being removed to the dotted line position shown in FIGURE 3 to provide ready access to the rotor for cleaning and replacement of hammers.

The modification illustrated in FIGURE 4 is in all respects the same as that illustrated in FIGURE 3, with the exception, however, that an adjustable baffle plate 400 is provided inside the housing of the mechanism in the manner illustrated. The baffle plate preferably extends entirely across the width of the machine and is mounted on a pivot 401. It is capable of being put into any adjustable position by a handle, not shown, and held in the selected position during the operation of the machine. One such position is illustrated by the dotted lines in FIGURE 4.

In some instances during the operation of this fiberizer, when no baffle plate is provided, a substantial pressure is developed in the apparatus which exerts itself in the direction toward the entrance of the apparatus or, in other words, in a direction opposite to that of the movement of the cane into and through the fiberizer. In consequence, in such cases, the cane buster which is located ahead of the fiberizer is subjected to unwanted internal pressures and the discharge of air currents flowing in a direction counter to the movement of the material through the buster and the fiberizer. Efforts to cut off the air flow producing such back pressure, by utilizing a baffle in the fiberizer, resulted in the development of a pressure in the fiberizer which exerted itself in the opposite direction or, in other words, in the direction of the feed of the fiberized cane through and from the fiberizer. Whereas this result eliminated the unwanted back pressure, it established an equally objectionable and unwanted pressure in the apparatus beyond the fiberizer.

It has now been discovered that this problem can be satisfactorily solved by having an adjustable baffle plate 400 of the type illustrated in FIGURE 4 and that, by the adjustment thereof during the operation of the fiberizer, the tendency of the fiberizer to develop unwanted internal pressures can be satisfactorily handled by balancing the pressures in the two directions, namely, in the direction toward the outlet and in the direction toward the inlet. By so adjusting the baffle, these two pressures can be made to counteract each other in a manner producing a completely satisfactory result.

The forms of this invention herein disclosed are illustive and are given only by way of example. The scope of the invention is not to be limited thereby as it is intended that the appended claims be construed as broadly as may be permitted by the prior art.

We claim:
1. An apparatus for fiberizing sugar cane comprising a rotor having pivoted hammers mounted thereon, an anvil disposed adjacent one side of and below said rotor and in close fiberizing association with the hammers thereof, a housing for said rotor and anvil, a feed opening at the top of said apparatus through which broken cane is fed to the space between said anvil and rotor, a driven feeding roller mounted below said feed opening and adjacent to the top portion of said rotor and above said anvil for supporting the broken cane entering said feed opening and feeding same to said hammers, said housing providing a surface disposed to receive the fiberized material discharged from the anvil by the action of the hammers of said rotor, said anvil being mounted at one of its ends on a pivot which is adjustable toward and away from the axis of the rotor and said anvil being angularly adjustable on said pivot toward and away from said rotor, whereby the space between said anvil and rotor may be adjusted as to shape and magnitude.

2. An apparatus of the construction defined in claim 1 further characterized in that the anvil may be moved on its pivotal mounting to a position to give access to said rotor.

3. An apparatus of the construction defined in claim 1 further characterized in that an air passage is provided in said housing between said surface and the rotor to permit the recirculation of air taken from the space adjacent said surface, around the rotor, under the driving force of the hammers of said rotor.

4. An apparatus of the construction defined in claim 3 further characterized in that a baffle is provided for partially closing the air passage between the ends of the hammers and said surface.

5. The apparatus of the construction defined in claim 4 further characterized in that said baffle is adjustable to control the relative pressures in said fiberizer exerted, respectively, in the directions of the inlet and outlet of said fiberizer.

References Cited

UNITED STATES PATENTS

| Re. 12,659 | 6/1907 | Williams | 241—287 X |
| 1,760,245 | 5/1930 | Lykken | 241—59 X |
| 2,172,886 | 9/1939 | Gabel | 241—289 X |
| 3,083,921 | 4/1963 | Danyluke | 241—186 |

ROBERT C. RIORDON, *Primary Examiner.*

D. G. KELLY, *Assistant Examiner.*